Patented Sept. 7, 1948

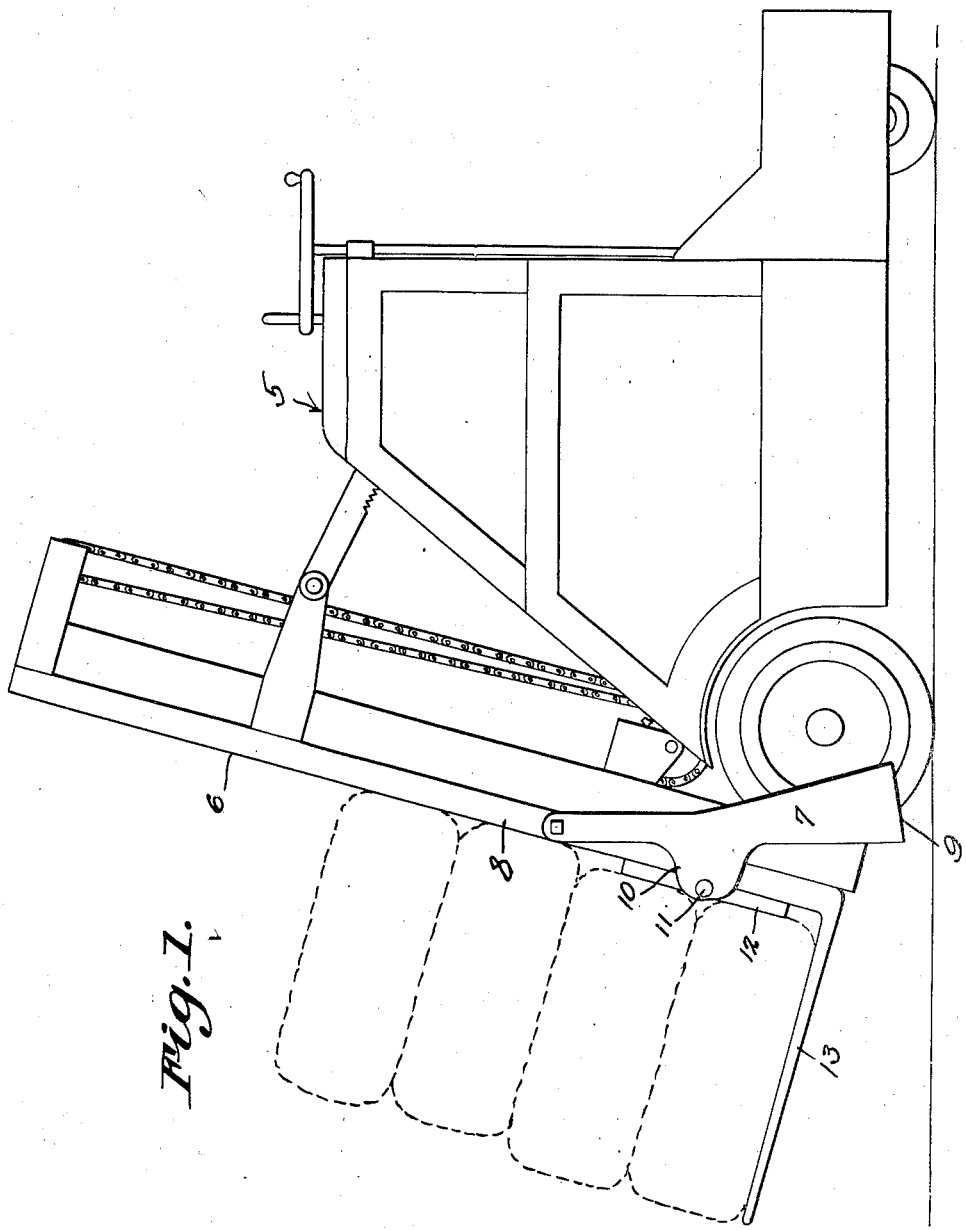

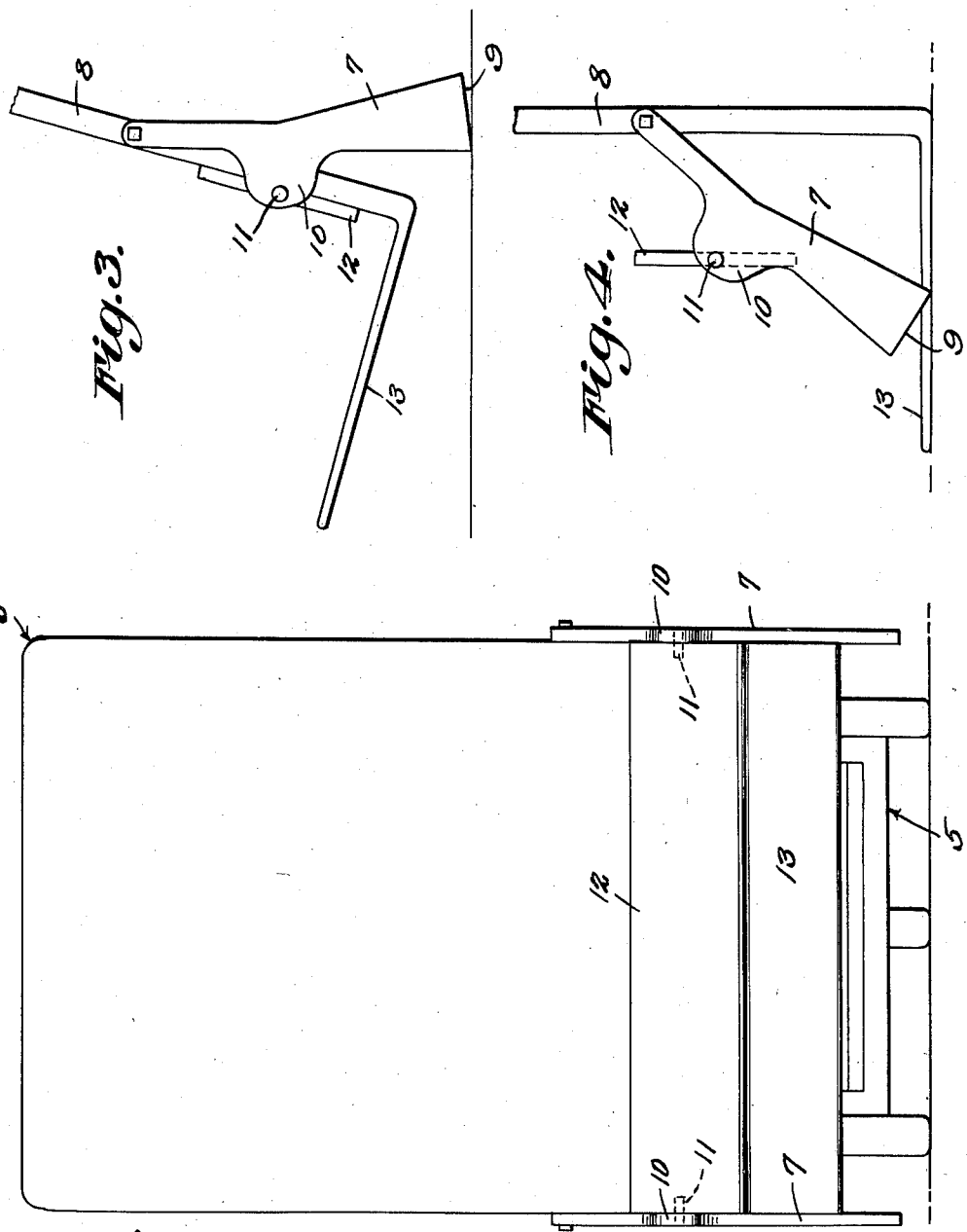

2,448,944

UNITED STATES PATENT OFFICE 2,448,944

UNLOADING DEVICE FOR MOBILE TRACTORS

Robert L. Woodward, Jr., Nashville, Tenn.

Application May 23, 1946, Serial No. 671,781

4 Claims. (Cl. 214—82)

This invention relates to an automatic unloading device for mobile tractors, an object of the invention being to provide an unloading mechanism which will operate to push the load from the carrier of the tractor as the carrier is lowered to the surface on which the tractor moves, and when the tractor is backed with the carrier in this position.

Another object of the invention is to provide an unloading device wherein the carrier presents a wide, smooth bag-supporting surface, eliminating the usual pronged bag support that frequently punctures or damages the bags carried thereby.

Another important object of the invention is to provide an unloading device which will push the load from the carrier in layers, avoiding spills, and at the same time conserving storage space.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a mobile tractor equipped with an unloading device constructed in accordance with the invention.

Figure 2 is a front elevational view thereof, illustrating the load carrying mechanism in its elevated position.

Figure 3 is a fragmentary elevational view illustrating the load carrying member as lowered, the unloading mechanism resting on the floor surface.

Figure 4 is a fragmentary side elevational view illustrating the position of the unloading device when the tractor has been backed and the load has been pushed from the carrier.

Referring to the drawings in detail, the tractor which is indicated by the reference character 5 is of the usual and well known construction, and is provided with the usual tilting carrier 6, the carrier being also constructed so that it may swing on a horizontal axis so that it may be swung from an inclined supporting position, as shown by Figure 1 of the drawings, to the vertical position as shown by Figure 4 of the drawings, for discharging its load.

The unloading mechanism embodies a pair of arms 7 which are pivotally connected to the side bars 8 of the carrier, at points in spaced relation with the lower end of the carrier, the distance between the lower end of the carrier and the pivot points of the arms 7, being appreciably less than the lengths of the arms 7, for purposes hereinafter more fully described.

As clearly shown by the drawings, these arms 7 have wide lower ends 9 that are adapted to rest on the surface on which the structure is supported. Extending forwardly from the arms 7 at points intermediate the ends thereof, are enlargements 10 which are formed with openings to receive the pins 11 that form a pivotal support for the pusher plate 12, which rests against the bagged material stacked on the carrier, when the carrier is loaded, as shown by Figure 1 of the drawings.

When the carrier is loaded and it is desired to dump the load, it is only necessary to operate the mechanism of the tractor to lower the carrier, and since the arms 7 normally hang in position as shown by Figure 1 of the drawings, it will be seen that as the carrier is lowered, the lower wide ends 9 of the arms 7 will rest on the surface, supporting the weight of the carrier and its load.

The tractor is now backed, and the carrier swings from the position shown by Figure 3 of the drawings to the position shown by Figure 4 of the drawings. As the carrier moves rearwardly, the arms remain in a position in contact with the floor surface, the pusher plate providing a stop for the load to cause the load to slide over the wide lower supporting plate 13 of the carrier, where it is discharged in a pile.

With this structure it will be seen that the load may be removed without danger of the load spilling, and with the minimum amount of maneuvering of the truck.

Having thus described the invention, what is claimed is:

1. The combination with a pivoted load carrier of a mobile tractor, of an unloading mechanism embodying arms pivotally connected to the load carrier and adapted to contact the floor surface below the load carrier, a pusher plate secured to the arms and adapted to engage the load, moving the load from the load carrier, as the load carrier is lowered and the arms moved into contact with the floor surface, during the backing of the tractor.

2. The combination with a pivoted load carrier including a supporting plate, of a mobile tractor, of an unloading mechanism embodying arms pivotally connected to the load carrier at points spaced from the bottom of the carrier, a distance less than the lengths of the arms, a pusher plate pivotally connected to the arms and adapted to move with respect to the supporting plate of the carrier, forcing material from the supporting plate as the tractor is backed away from the load.

3. The combination with a pivoted load carrier including a supporting plate, of a mobile tractor, an unloading mechanism, embodying a pivoted pusher plate mounted on the carrier, movable arms to which the pusher plate is connected, said arms adapted to engage the floor surface when the carrier is lowered, said arms adapted to hold the pusher plate against movement as the tractor is moved rearwardly, and the carrier is moved away from the pusher plate, whereby the load on the supporting plate is pushed therefrom.

4. The combination with a pivoted load carrier including a supporting plate, of a mobile tractor, of an unloading mechanism embodying a pivoted pusher plate pivotally mounted on the supporting plate of the carrier and adapted to rest against the load on the carrier plate, arms connected with the pusher plate, said arms adapted to hold the pusher plate stationary when the tractor and carrier are moved rearwardly, and said pusher plate adapted to push the load from the supporting plate of the carrier, as the supporting plate moves from under the load.

ROBERT L. WOODWARD, Jr.

REFERENCES CITED

The following references are of record in the file of this patent:

UNITED STATES PATENTS

| Number | Name | Date |
|---|---|---|
| 1,093,444 | Lewis et al. | Apr. 14, 1914 |
| 1,542,023 | Alexander | June 16, 1925 |
| 2,371,661 | Wilms | Mar. 20, 1945 |